(12) United States Patent
Ramaswamy et al.

(10) Patent No.: US 6,628,768 B1
(45) Date of Patent: Sep. 30, 2003

(54) SYSTEM AND METHOD OF RESPONDING TO AN INCOMING CALL WHILE CONFERENCING

(75) Inventors: Kumar Ramaswamy, Indianapolis, IN (US); Paul Gothard Knutson, Indianapolis, IN (US); Maneck Behram Kapadia, Carmel, IN (US)

(73) Assignee: Thomson Licensing S. A., Boulogne (FR)

( * ) Notice: Subject to any disclaimer, the term of this patent is extended or adjusted under 35 U.S.C. 154(b) by 0 days.

(21) Appl. No.: 09/581,267

(22) PCT Filed: Dec. 19, 1997

(86) PCT No.: PCT/US97/23373

§ 371 (c)(1),
(2), (4) Date: Nov. 16, 2000

(87) PCT Pub. No.: WO99/31865

PCT Pub. Date: Jun. 24, 1999

Related U.S. Application Data
(60) Provisional application No. 60/069,541, filed on Dec. 12, 1997.

(51) Int. Cl.[7] ............................................... H04M 3/42
(52) U.S. Cl. .............................. 379/202.01; 379/205.01
(58) Field of Search ..................... 379/202.01, 204.01, 379/205.01, 206.01

(56) References Cited

U.S. PATENT DOCUMENTS 5,373,549 A * 12/1994 Bales et al. ............... 379/93.21
5,883,944 A * 3/1999 Burke et al. ................. 379/159
6,035,027 A * 3/2000 Alleman ................. 379/205.01

FOREIGN PATENT DOCUMENTS

| EP | 661897 | 7/1995 | ............ H04Q/7/38 |
| EP | 805582 | 11/1997 | ............ H04M/3/56 |
| WO | 97/34406 | 9/1997 | ............ H04M/3/48 |

OTHER PUBLICATIONS

European Search Report Dated Sep. 9, 1998.

* cited by examiner

*Primary Examiner*—Ahmad F. Matar
*Assistant Examiner*—Karen Le
(74) *Attorney, Agent, or Firm*—Joseph S. Tripoli; Harvey D. Fried; Joseph J. Kolodka

(57) ABSTRACT

A method and apparatus for responding to an incoming call on one of a plurality of external telephone lines when a conference call is in progress on that external telephone line includes the following. First, caller identification information is received relating to the incoming call. Then the plurality of handsets involved in the conference call are notified that an incoming call has been received. Should it be desired to answer that incoming telephone call via a callback, a pre-recorded message is transmitted to the caller of the incoming call requesting the caller hang up and the incoming telephone call is terminated. The caller of the incoming call is then called back on a unused external telephone line using the previously received caller identification information relating to that incoming call. Finally, one of the plurality of handsets involved in the conference call is connected to the caller of the incoming call.

14 Claims, 3 Drawing Sheets

SYSTEM AND METHOD OF RESPONDING TO AN INCOMING CALL WHILE CONFERENCING

This is a provisional application No. 60/069,541 filed Dec. 12, 1997.

The present invention relates to a multiline subscriber telephone system, and a method of operating such a system, which implements an incoming call-waiting feature for an incoming call on an external telephone line which is in use on a conference call without requiring that the conference call be suspended while the incoming call is answered.

FIG. 1 is a block diagram of a subscriber telephone system. In FIG. 1, a plurality of bidirectional external telephone lines 5 are coupled to corresponding terminals of a telephone system termed customer premises equipment (CPE) 30. The CPE 30 is also bidirectionally coupled to a plurality of handsets 20. The handsets 20 may be coupled to the CPE 30 via standard phone wires, or via wireless radio transceivers in the CPE 30 and the handsets 20, or via a combination of wired and wireless links.

For example, current multiline business phone systems can link up to four external telephone lines to up to twelve corresponding handsets. These handsets may be, for example, wireless handsets operating over a radio frequency (RF) link in the 900 MHz unlicensed frequency band. In general, when a user wishes to place an outgoing call, he picks up one of the handsets 20. The CPE 30 senses this, and connects that handset to an unused one of the external phone lines 5. The user hears a dial tone and makes the outgoing call in the usual manner. When an incoming call arrives on one of the external phone lines 5, the CPE 30 assigns one of the handsets 20 to that phone line.

There are many known techniques for assigning the incoming phone call to a handset. For example, the assignment may be a permanent assignment in which each handset 20 is assigned to a corresponding one of the external telephone lines 5, or the CPE 30 may simply route the incoming call to any unused handset 20, or all incoming calls may initially be routed to a single handset 20 (e.g. a receptionist), or all of the handsets 20 may ring in response to all incoming calls. Any technique for assigning the incoming call to one or more handsets may be used. The handset 20 assigned to receive the incoming phone call rings, the user picks up the handset 20 and responds to the incoming call in the usual manner.

There are several known features which may be provided by a telephone system 10 such as is illustrated in FIG. 1. For example, the system 10 can provide internal users of the system with an intercom feature. This feature may be implemented by allowing one internal user to call another directly through the CPE 30 without using any of the external telephone lines 5. This feature may also allow several internal users to form an internal conference call amongst themselves, also through the CPE 30 without using an external telephone line 5, all in a known manner.

Another example is the ability to form a conference call by allowing more than one of the handsets 20 to be connected to a single external telephone line 5, thus enabling more than one local user to talk to the party at the other end of the external telephone line 5. This feature may be implemented by allowing a user to place an outgoing call over one of the external telephone lines 5 in the manner described above, and then allowing the user to attach other internal users to that telephone call by connecting their handsets 20 in common to the external telephone line 5 connected to the outside party, all in a known manner.

A known feature, which is provided by the telephone transmission system to which the external telephone lines 5 are coupled, is "call waiting". This feature provides an alert signal to a subscriber handset which is currently engaged in a telephone call when an incoming call is attempting to connect to that subscriber's handset. In response to the alert signal, the handset provides an indication of an incoming phone call to the subscriber, in the form a beep. In response to this indication, that subscriber may temporarily suspend the current telephone call (i.e. put it on "hold") and answer the incoming telephone call. When the newly received telephone call is complete, the subscriber may reconnect to the original telephone call.

In a normal consumer arrangement where a standard telephone is attached to the external telephone line, no special circuitry or equipment is necessary to implement this feature, because this feature is provided by the central office. In a multiline subscriber telephone system in which a plurality of handsets 20 are connected to a plurality of external telephone lines 5, the CPE 30 need not provide any services for this feature other than connecting a handset 20 to an external telephone line 5. However, because the multiline telephone system may also provide other functions in conjunction with the 'call waiting' feature, and/or enhancements to the 'call waiting' feature, the CPE 30 in such a system may include circuitry to interact with the central office, and provide the 'call waiting' feature.

Another known feature which is provided by the telephone transmission system is "caller identification (ID)". This feature is implemented by the central office. 'Caller ID' inserts information about an incoming telephone call to a subscriber when the subscriber's handset receives the indication of an incoming call. The information about the incoming telephone call includes the telephone number from which that call is made. That information may be displayed at the called handset 20, and used to determine who is calling and what action to take. This information may also be supplied to a computer system, which can look up previously stored data related to the calling telephone number and display that data to the called party.

There are two modes of 'caller ID'. In mode I 'caller ID', the telephone being called is available to receive incoming telephone calls (i.e. on-hook). Information about the incoming phone call is transmitted from the central office to the handset being called as a part of the ring signal between the first and second rings. There must be apparatus at the location of the called handset which is capable of extracting this information and either displaying it, or supplying it to a computer system, as described above. The user of the called handset can consult the information displayed, or from the computer system, and decide whether to accept the incoming call and pick up the handset, or not.

Mode II 'caller ID' may be used in conjunction with the 'call waiting' feature described above. In mode II 'caller ID', the telephone being called may be engaged in a telephone call (i.e. off-hook). Information about the incoming call, including the calling telephone number, is sent along with the alerting signal which indicates that an incoming call is attempting to connect to the currently busy handset. As with mode I 'caller ID', there must be apparatus which can extract this information, and either display it, or supply it to a computer system. The subscriber receives the 'call waiting' beep, as described above, and can view the information relating to the incoming telephone call. Based on that information, the subscriber can decide whether to suspend the present telephone call and accept the new incoming call, or not.

One combination of the above known features is conference calling and 'call waiting'. Referring again to FIG. 1, more than one local handset 20 can be simultaneously talking to an external party via one of then external telephone lines 5 when an incoming call arrives for that external telephone line. In currently known systems, when the CPE alerting signal (CAS) arrives from the central office, one, several, or all of the local handsets 20 produces a beep indicating that a call is waiting. In response, one of the handsets may take control and put the current conference call on hold to answer the incoming call. The controlling handset is connected, over the external telephone line, to the caller of the incoming call. This, however, puts the entire conference call on hold. None of the local handsets can talk to the original external conference party. Only when the controlling local handset 20 completes the telephone call to the newly arrived incoming call is the external party reconnected to the local handsets 20 and the conference call reestablished.

It is desirable that the users of local handsets 20 involved in a conference call be notified of a newly arrived incoming call. However, it is also desirable that the user of the controlling one of the local handsets 20 be able to answer the incoming call without unduly interrupting the conference call.

In accordance with principles of the present invention, a method for responding to an incoming call on one of a plurality of external telephone lines when a conference call is in progress on that external telephone line includes the following steps. First, mode II caller ID information is received relating to the incoming call. Then the plurality of handsets involved in the conference call are notified that an incoming call has been received. Should it be desired to answer that incoming telephone call, a pre-recorded message is transmitted to the caller of the incoming call requesting the caller hang up. The caller of the incoming call is then called back on a unused external telephone line using the previously received caller identification information relating to that incoming call. Finally, one of the plurality of handsets involved in the conference call is connected to the caller of the incoming call.

In accordance with another aspect of the present invention, a subscriber telephone system includes a source of a plurality of external telephone lines, a plurality of handsets, and a base unit which is coupled between the external telephone line source and the handsets. There is conference call circuitry in the base unit which establishes a conference call involving the handsets and one of the external lines. Caller identification circuitry, which is coupled to the external telephone lines, receives caller identification information related to an incoming telephone call on the conference call line. Call waiting circuitry sends a notification to the handsets that an incoming call has been received, and receives instructions from a controlling handset to respond to the incoming call by callback. Voice message circuitry transmits a pre-recorded message to the caller of the incoming call requesting the caller hang up. Callback circuitry places a callback to the caller of the incoming call on an unused line using the caller identification information, and connects the controlling handset to the callback line.

A multiline subscriber telephone system according to the present invention provides the call-waiting function for an external telephone line carrying a conference call without requiring that the conference call be unduly interrupted, and without requiring any changes to the central office.

Figure 1:
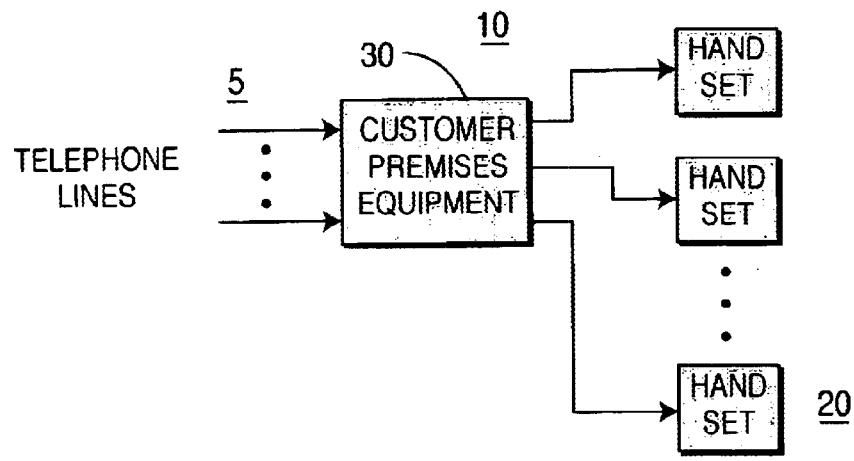
FIG. 1 is a block diagram of a known subscriber telephone system.
Figure 2:
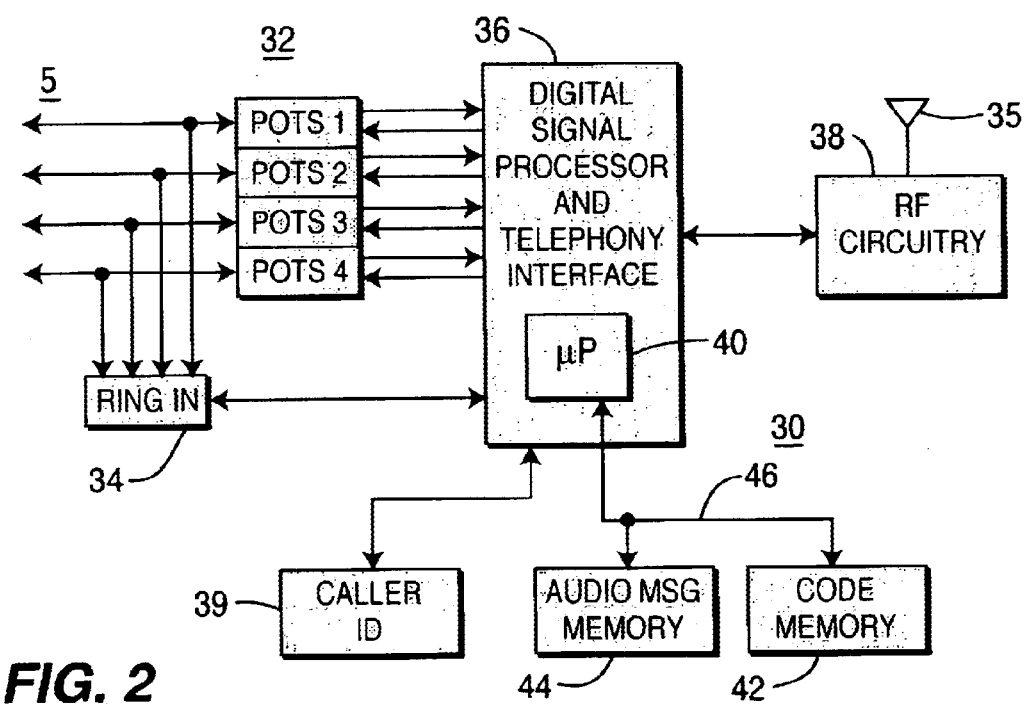
FIG. 2 is a more detailed block diagram of customer premises equipment according to principles of the present invention.

FIG. 2 is a more detailed block diagram of customer premises equipment 30 (or base unit) according to principles of the present invention. In FIG. 2, the base unit is coupled to the handsets 20 (of FIG. 1) via an RF link, preferably in the 900 MHz band. One skilled in the art will understand that the handsets 20 may be coupled to the base unit by any available means.

In the embodiment illustrated in FIG. 2, four bidirectional external telephone lines 5 are coupled to corresponding terminals of four corresponding POTS (plain old telephone service) interface circuits 32 (POTS 1, POTS 2, POTS 3, POTS 4, respectively), and to respective input terminals of a ring input signal recognition circuit 34. Each of the respective POTS interface circuits has an output terminal and an input terminal coupled to corresponding terminals of a digital signal processor and telephony interface (DSP/TI) circuit 36. The ring input signal recognition circuit 34 has a four line output terminal coupled to a corresponding input terminal of the DSP/TI circuit 36. The DSP/TI 36 has a bidirectional output terminal coupled to a corresponding terminal of RF circuitry 38. The RF circuitry 38 is coupled to an RF antenna 35.

The DSP/TI circuit 36 includes a microprocessor 40. The microprocessor 40 is coupled to a code memory 42 and an audio message memory 44 via a system bus 45. Although illustrated as separate memories, one skilled in the art will understand that these memories could be different portions of a single memory circuit. In addition, although illustrated as external to the DSP/TI 36, one skilled in the art will understand that the DSP/TI 36 could include internally all, or a part of the audio message memory 44 and code memory 42. The DSP/TI is also coupled to a caller ID processing circuit 39 via a bidirectional signal line.

In operation, the POTS interface circuits 32 operate in a known manner to receive signals from and transmit signals to the external telephone network, including both audio signals, and the various other non-voice signals transmitted over the external telephone lines. The ring input signal recognition circuit 34 specially recognizes the ring signals received from the external telephone lines, and supplies indications of the presence of ring signals on the respective external telephone lines to the DSP/TI 36, also in a known manner.

Similarly, the RF circuitry 38 operates to transmit audio signals to and receive audio signals from the handsets 20 (of FIG. 1). In the illustrated embodiment, the RF circuitry employs a combination of time division multiplexing and frequency band selection to overcome interfering sources and to maintain reliable links between the base unit 30 and the remote handsets 20 in a known manner. In the illustrated embodiment four handsets 20 are illustrated. However, known RF circuitry can support twelve or more handsets 20.

The DSP/TI circuit 36 operates as a 4×12 telephone switch for connecting the four external telephone lines 5 to up to twelve handsets 20.

The microprocessor 40 reads instructions from the code memory 42, and reads data from and writes data to the code memory 42. Accordingly the code memory 42 may include non-volatile read only memory (ROM) containing the program code for the microprocessor 40, and read/write memory (RAM) for the data. In addition the microprocessor 40 includes input/output circuitry (now shown) for receiving status signals from and transmitting control signals to the various interface circuits, and internal registers (not shown), in order to control the operation of the telephone system 10, all in a known manner.

For example, the microprocessor 40 can control the telephone system 10, in a known manner, to allow a conference call to be set up. To do this, first a telephone call is established between a remote party via one of the external telephone lines 5 and several of the handsets 20 (of FIG. 1) via the RF circuitry 38 and antenna 35. Once established, the microprocessor 40 continues to monitor that external telephone line for various alert signals which the external telephone network (to which the external telephone lines are connected) sends to the base unit 30. One such signal is the mode II 'call waiting' customer alert signal.

Figure 3:
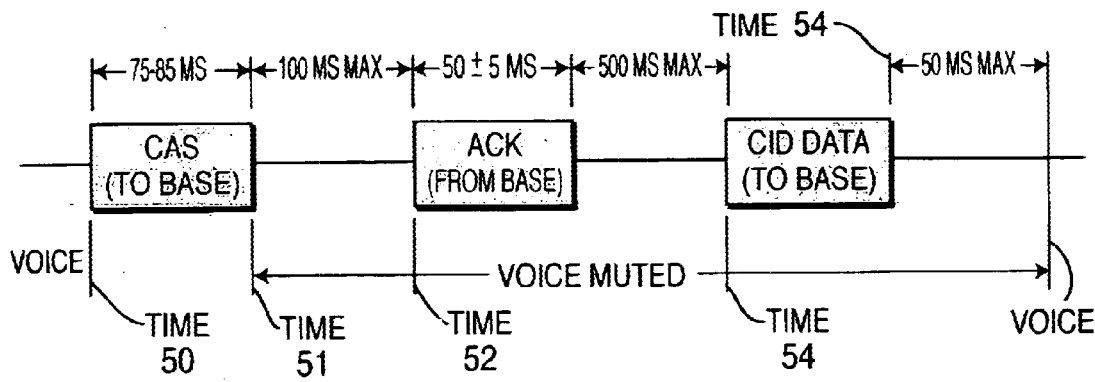
FIG. 3 is a waveform diagram illustrating the timing of signals transmitted from the central office to customer premises equipment, and is useful in understanding the operation of the present invention.
Figure 4:
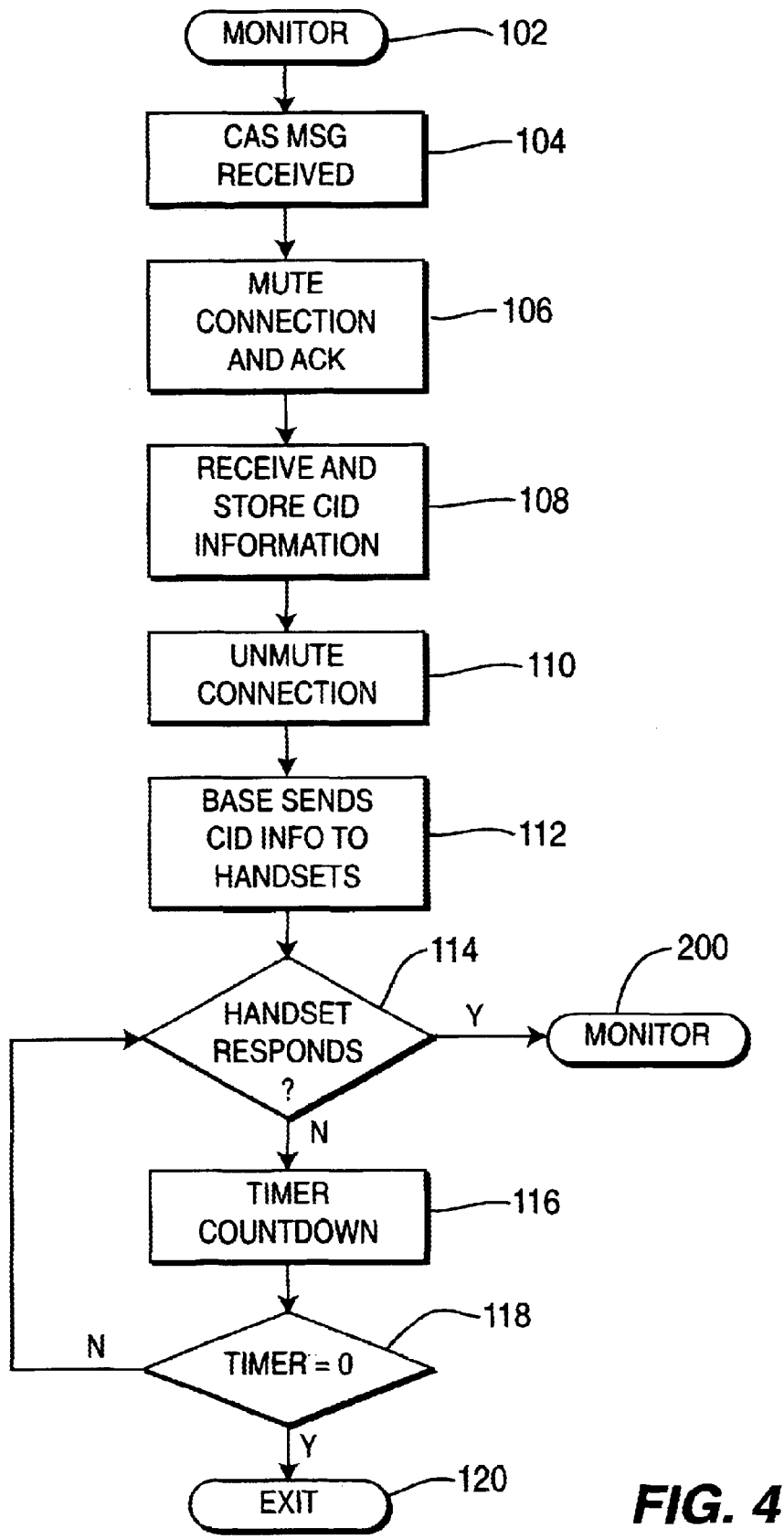
FIGS. 4 and 5 are flowcharts also useful in understanding the operation of the present invention.
Figure 5:
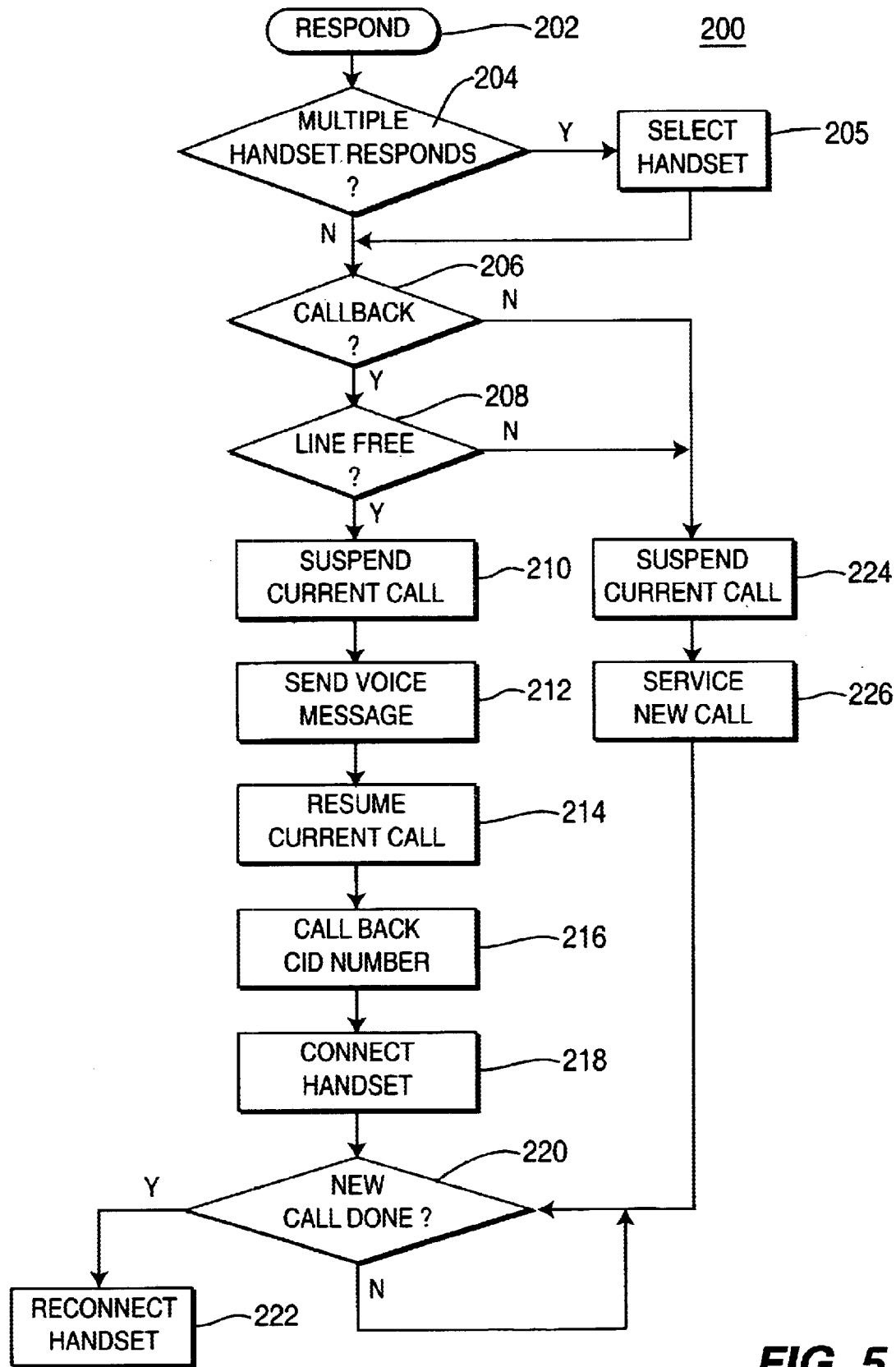

FIG. 3 is a waveform diagram illustrating the timing of a 'call waiting' and 'caller ID' sequence of signals transmitted between the central office and the customer premises equipment, and FIGS. 4 and 5 are flowcharts, all useful in understanding the operation of the present invention in response to this signal sequence. Referring to FIG. 3, the horizontal axis represents time, and the illustrated signals, represented by rectangles, are non-voice signals inserted into the external telephone line currently in use for a conference call, as described above. At the leftmost portion of the waveform, a standard voice conversation is taking place. At or just before time 50, an incoming call for the external telephone line is received. A CPE alert signal (CAS), of known format and having a duration of from 75 to 85 milliseconds (ms), is transmitted from the central office to the base unit 30 to alert the base unit of the incoming call, i.e. the CAS is a 'call waiting' signal. This signal requires an acknowledgment signal (ACK), also be sent from the base unit to the central office within 100 ms of the completion of the CAS signal. At time 52, the base unit begins transmission of the acknowledgment signal ACK. of known format and having a duration of 60±5 ms, to the central office.

At time 54, within 500 ms after the receipt of an acknowledgment signal (ACK), the central office transmits a data burst, in a known frequency shift keyed format, to the base unit. The data burst can include one or more messages. Specifically, this data burst contains the caller ID (CD) information related to the incoming call. The duration of this data burst depends upon the amount of data in the messages. The CID information contained within the data burst may be extracted, and data related to the incoming telephone call displayed to the user, as described above.

In order for signals to be transmitted successfully between the central office and the base unit, the telephone conversation on the external telephone line is muted during the signals sequence illustrated in FIG. 3. From the end of the CAS signal at time 51 until no more than 50 ms after completion of the data burst at time 55 the conversation is muted. The duration of time the conversation is muted is around one second, which is not unduly intrusive.

FIG. 4 illustrates the operation of the base unit while monitoring the external telephone line to detect the CAS signal. In the illustrated embodiment, in which the operation of the base unit is controlled by the microprocessor 40, the flowchart of FIG. 4 represents the operation of a portion of the program executed by the microprocessor 40.

In block 102, the microprocessor 40 in the base unit 30 begins to monitor the external telephone line 5 on which the conference call is taking place. In block 104 the CAS signal is recognized. In block 106 the conference call is muted and the acknowledgment signal is transmitted to the central office. In block 108, the data burst containing the CID information is received. The CID information is extracted and stored in code memory 42 for retrieval later. In block 110, the conference call is unmuted. In block 112, an indication that an incoming call is waiting, which may be in the form of a beep, is sent from the base unit 30 to all of the handsets 20 involved in the conference call, along with caller ID information related to the incoming call. The base unit 30 then begins to wait for a response from the handsets 20. In block 114 a test is made to determine if a handset has responded. If so, then a portion 200 of the microprocessor 40 program is executed to respond to the incoming call. Otherwise, in block 116, a timer is decremented. In block 118, if the timer has reached zero, then it is assumed that no handset 20 is going to handle the incoming call, and the monitoring program is exited in block 120. If, on the other hand, the timer has not reached zero, then the handsets 20 are checked again to determine if one or more has responded to the incoming call.

Referring now to FIG. 5, the portion 200 of the microprocessor 40 program for handling the incoming call is illustrated is entered in block 202. In block 204, it is determined whether more than one of the handsets 20 has responded to the incoming call. If more than one handset 20 has responded to the incoming call, then one is selected to control the response. This may be by any of known methods for selecting one of a plurality of competing resources, such as first-come-first-served, or round-robin, or a priority scheme. In block 206 the microprocessor 40 determines if the controlling handset 20 indicated that the incoming telephone call was to be handled using the callback scheme, described in more detail below. If a callback was indicated by the controlling handset 20 in block 206, then in block 208 a check is made to determine if one of the external telephone lines 5 is free.

If either the controlling handset 20 did not request a callback, or no external telephone line 5 is available, then the incoming call is handled in the normal 'call waiting' manner. That is, the current conference call is suspended in block 224. This means that the external conference call party is temporarily disconnected from the base unit 30 (i.e. is put on hold), and the controlling handset 20 is coupled to receive the incoming call. In block 220, the microprocessor 40 waits until the incoming call is completed. Only at this time, in block 222, is the external conference call party reconnected to the base unit 30 and the controlling handset 20 reconnected to the conference call, all in a known manner.

If, however, a callback was requested by the controlling handset 20, and an external telephone line 5 is available, then a callback sequence is initiated. In block 210, the current conference call is suspended, i.e. the external conference call party is put on hold. In block 212, the microprocessor 40 retrieves data representing a prerecorded voice message from the audio message memory 44 and transmits the voice message to the caller of the incoming call. This message instructs the caller to hang up the phone, and that they will be called back immediately. The base unit then terminates the incoming telephone call. In block 214, the current conference call is resumed on the current external telephone line 5, with the exception of the controlling handset 20. In block 216, a call is placed on the free external telephone line to the number of the incoming call, as indicated by the previously stored CID information (block 108 of FIG. 4). When this outgoing callback is placed, the controlling handset 20 is connected to that external telephone line in block 218. The microprocessor 40 then waits for that call to complete in block 220. When the outgoing call is complete, then the controlling handset 20 is reconnected to the conference call in block 222.

By permitting a local handset the option of handling an incoming call on a line already involved in a conference call by a callback mechanism as described above, an entire conference call need not be interrupted while the incoming call is answered. Instead, the call need only be interrupted long enough to send a voice message to the caller to hang up. Then only one of the local handsets need leave the conference call to answer the incoming call. This is especially advantageous in a business setting in which conference calls are most likely to be very important, and least amenable to interruption.

What is claimed is:

1. A method for responding to an incoming call on one of a plurality of external telephone lines to which a subscriber telephone system comprising a plurality of handsets is coupled, when a conference call is in progress on one of the external telephone lines, the method comprising the steps of:
   receiving caller identification information relating to the incoming call;
   notifying the plurality of handsets involved in the conference call that an incoming call has been received, the method characterized by the further steps of:
      receiving instructions from a controlling one of the plurality of handsets to respond to the incoming call by callback;
      transmitting a pre-recorded message to the caller of the incoming call requesting the caller hang up;
      placing a callback to the caller of the incoming call on an unused one of the plurality of external telephone lines using the caller identification information relating to the incoming call; and
      connecting the controlling one of the plurality of handsets involved in the conference call to the callback external telephone line.

2. The method of claim 1 further comprising the step of reconnecting the controlling one of the plurality of handsets to the conference call when the callback is complete.

3. The method of claim 1 wherein the step of receiving caller identification information comprises the steps of:
   monitoring the one of the plurality of external telephone lines for non-voice signals from a central office coupled to the plurality of external telephone lines;
   detecting a customer premises equipment alert signal;
   muting the conference call;
   sending an acknowledgment signal to the central office;
   receiving the data burst containing the caller identification information;
   unmuting the conference call; and
   storing the caller identification.

4. The method of claim 1 wherein the step of transmitting the pre-recorded message comprises the steps of:
   suspending the conference call;
   transmitting the pre-recorded message to the caller of the incoming call;
   ending the incoming telephone call; and
   resuming the conference call.

5. The method of claim 1 wherein the step of receiving instructions comprises the steps of:
   determining if more than one of the plurality of handsets responds to the notification;
   if more than one of the plurality of handsets has responded to the notification, selecting one of the more than one of the plurality of handsets as the controlling handset; and
   receiving instructions from the controlling handset.

6. The method of claim 1, wherein the subscriber telephone system further comprises a base unit, further comprising the step of connecting the plurality of handsets to the base unit via a 900 MHz radio frequency link.

7. A base unit of a subscriber telephone system having a source of a plurality of external telephone lines and a plurality of handsets, wherein the base unit is coupled between the external telephone line source and the plurality of handsets, the base unit comprising:
   conference call circuitry for establishing a conference call involving the plurality of handsets and one of the plurality of external lines;
   caller identification circuitry, coupled to one of the external telephone lines, for receiving caller identification information relating to an incoming telephone call;
   call waiting circuitry for notifying the plurality of handsets that an incoming call has been received, characterized in that the call waiting circuitry is for receiving instructions from a controlling one of the plurality of handsets to respond to the incoming call by callback;
   voice message circuitry (40, 44) for transmitting (212) a pre-recorded message to the caller of the incoming call requesting the caller hang up; and
   callback circuitry for placing a callback (216) to the caller of the incoming call on an unused one of the plurality of external telephone lines using the caller identification information related to the incoming call and for connecting (218) the controlling one of the plurality of handsets to the callback external telephone line.

8. The system of claim 7 wherein the caller identification circuit comprises:
   circuitry for monitoring the one of the plurality of external telephone lines for non-voice signals from a central office coupled to the plurality of external telephone lines;
   circuitry for detecting a customer premises equipment alert signal;
   circuitry for muting the conference call;
   circuitry for sending an acknowledgment signal to the central office;
   circuitry for receiving a data burst containing the caller identification information;
   a memory for storing the caller identification information; and
   circuitry for unmuting the conference call.

9. The system of claim 8 wherein the callback circuitry comprises circuitry for retrieving the caller identification information from the memory.

10. The system of claim 7 wherein the call waiting circuitry comprises:
    circuitry for determining if more than one of the plurality of handsets responds to the notification;
    circuitry for selecting one of the more than one of the plurality of handsets as the controlling handset if more than one of the plurality of handsets has responded to the notification;

circuitry for receiving instructions from the controlling handset.

11. The system of claim 7 wherein the voice message circuitry comprises:

a memory for storing data representing the pre-recorded message circuitry for suspending the conference call;

circuitry for retrieving the message representative data from the memory;

circuitry for converting the message representative data to an audio message signal;

circuitry for transmitting the audio message signal to the caller of the incoming call;

circuitry for terminating the incoming telephone call; and circuitry for resuming the conference call.

12. The system of claim 7, wherein the callback circuitry further comprises circuitry for reconnecting the controlling one of the plurality of handsets to the conference call when the callback is complete.

13. The system of claim 7 wherein the conference call circuitry, the call waiting circuitry, the voice message circuitry, and the callback circuitry are comprised in a microprocessor.

14. The system of claim 7 wherein the base unit and each one of the plurality of handsets comprise respective 900 MHz radio frequency transceivers for connecting the handsets to the base unit.

* * * * *